(12) United States Patent
Christensen et al.

(10) Patent No.: US 11,038,400 B2
(45) Date of Patent: Jun. 15, 2021

(54) CONTROL OF A WIND TURBINE BASED ON A COMBINED POWER REFERENCE

(71) Applicant: VESTAS WIND SYSTEMS A/S, Aarhus N (DK)

(72) Inventors: Poul Brandt Christensen, Ry (DK); Jesper Sandberg Thomsen, Hadsten (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/720,128

(22) Filed: Dec. 19, 2019

(65) Prior Publication Data

US 2020/0204041 A1    Jun. 25, 2020

(30) Foreign Application Priority Data

Dec. 19, 2018  (DK) .............................. PA201870826

(51) Int. Cl.
| | |
|---|---|
| *H02K 7/18* | (2006.01) |
| *F03D 9/25* | (2016.01) |
| *F03D 80/80* | (2016.01) |
| *F03D 7/02* | (2006.01) |
| *H02P 9/02* | (2006.01) |

(52) U.S. Cl.
CPC .......... *H02K 7/1838* (2013.01); *F03D 7/028* (2013.01); *F03D 9/25* (2016.05); *F03D 80/82* (2016.05); *H02P 9/02* (2013.01)

(58) Field of Classification Search
CPC ......... H02K 7/1838; F03D 9/25; F03D 80/82; F03D 7/028; H02P 9/02
See application file for complete search history.

(56) References Cited

U.S. PATENT DOCUMENTS

| | | | |
|---|---|---|---|
| 2012/0119711 A1 | 5/2012 | Rozman et al. | |
| 2012/0205911 A1* | 8/2012 | Deng | H02M 5/45 |
| | | | 290/44 |
| 2017/0226988 A1* | 8/2017 | KJ R | F03D 7/048 |

FOREIGN PATENT DOCUMENTS

| | | |
|---|---|---|
| EP | 1790850 A1 | 5/2007 |
| EP | 2487784 A1 | 8/2012 |
| WO | 2012041527 A1 | 4/2012 |
| WO | 2018077530 A1 | 5/2018 |

OTHER PUBLICATIONS

Danish Patent and Trademark Office 1st Technical Examination for Application 2018P00155DK KH dated May 13, 2019.
European Extended Search Report for Application 19215159.5-1007 dated Apr. 29, 2020.

* cited by examiner

*Primary Examiner* — Sean Gugger
(74) *Attorney, Agent, or Firm* — Patterson + Sheridan, LLP (57) ABSTRACT

A method of controlling a wind turbine is provided. The method comprises providing a primary power reference signal and a secondary power reference signal. The primary power reference signal is limited according to a primary signal limit. The secondary power reference signal is limited according to a secondary signal limit. The primary power reference signal and the secondary power reference signal are combined to provide a combined power reference signal, which is provided to a power or torque control system of the wind turbine.

18 Claims, 5 Drawing Sheets

CONTROL OF A WIND TURBINE BASED ON A COMBINED POWER REFERENCE

FIELD OF THE INVENTION

The present invention relates to a method of controlling a wind turbine, and to a control system for a wind turbine, using a combined power reference.

BACKGROUND OF THE INVENTION

Modern wind turbines are typically variable-speed turbines. In such turbines, the power output is controlled, at least in certain operational modes, by controlling the speed at which the blades can rotate. For example, a torque can be applied to the rotor to limit rotational speed during high winds. The rotor speed is controlled using a power controller or a torque control system, such as a converter. The power or torque control system is in turn controlled using a power reference signal, typically generated by the turbine's main controller. As used herein, a power or torque control system may refer to a converter of the wind turbine, or to a power controller or torque controller.

The power reference signal may be generated based on the requirements of various control systems of the turbine. For example, the power reference signal may set an average rotor speed based on semi-static wind conditions, as well as providing for small variations to that average rotor speed for temporary condition changes. For example, small variations in the power reference signal may be used to provide damping to counteract vibrations in the turbine.

A limit is generally applied to the power reference signal to prevent damage to the power or torque control system. This limit may cause the power reference signal to become saturated, potentially cutting out small variations in the signal intended to implement temporary condition control, such as damping.

SUMMARY OF THE INVENTION

A first aspect of the invention provides a method of controlling a wind turbine, the method comprising:
  providing a primary power reference signal;
  limiting the primary power reference signal according to a primary signal limit;
  providing a secondary power reference signal;
  limiting the secondary power reference signal according to a secondary signal limit;
  combining the primary power reference signal and the secondary power reference signal to provide a combined power reference signal; and
  providing the combined power reference signal to a power or torque control system of the wind turbine.

The secondary power reference signal may be an alternating power reference signal or a temporary power reference signal.

The secondary power reference signal may comprises a plurality of (secondary) control system signals summed together.

In some embodiments, limiting the secondary power reference signal may comprise individually limiting each control system signal according to a respective individual limit.

In some embodiments, the method may further comprise:
  determining that the secondary power reference signal exceeds the secondary signal limit;
  identifying one or more of the plurality of control system signals as a priority signal; and
  modifying the other signals of the plurality of control system signals to limit the secondary power reference signal to the secondary signal limit.

In some embodiments, modifying the other signals of the plurality of control system signals may comprise applying a respective reduction factor to the one or more of the other signals of the plurality of control system signals.

In some embodiments, identifying one of the plurality of control system signals as a priority signal may comprise:
  determining that an operational parameter of the wind turbine is approaching or exceeds a supervision limit; and
  selecting a control system signal associated with the operational parameter as the priority signal.

In some embodiments, one or more of the control system signals may be associated with damping control systems of the wind turbine.

In some embodiments, the primary power reference signal may be a static or semi-static signal.

Some embodiments may further comprise limiting the combined power reference signal according to a combined signal limit prior to providing the combined power reference signal to the power or torque control system.

The combined signal limit may be variable.

In some embodiments, the secondary signal limit may limit a peak value of the secondary power reference signal to a value that is a predetermined proportion of the primary signal limit.

In some embodiments, the combined power reference signal may be provided to a converter of the wind turbine.

A second aspect of the invention provides a wind turbine control system configured to provide a combined power reference signal for a power or torque control system of a wind turbine, wherein the control system is configured to:
  provide a primary power reference signal;
  limit the primary power reference signal according to a primary signal limit;
  provide a secondary power reference signal;
  limit the secondary power reference signal according to a secondary signal limit; and
  combine the primary power reference signal and the secondary power reference signal to provide a combined power reference signal.

The control system may be further configured to perform any embodiment of the first aspect.

A third aspect of the invention provides a wind turbine comprising a control system according to any embodiment of the second aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
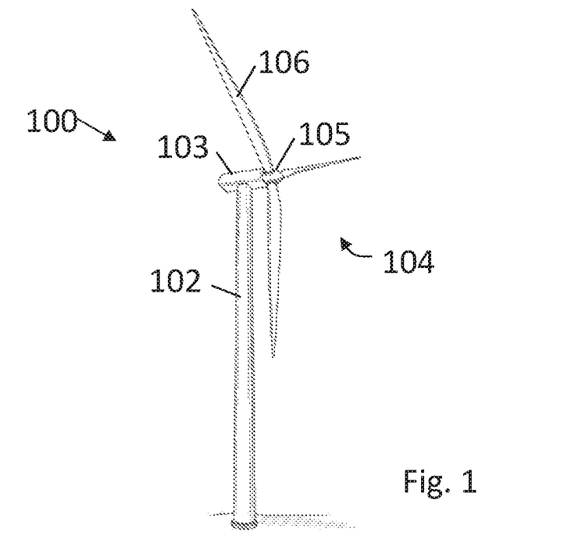
FIG. 1 is a schematic representation of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
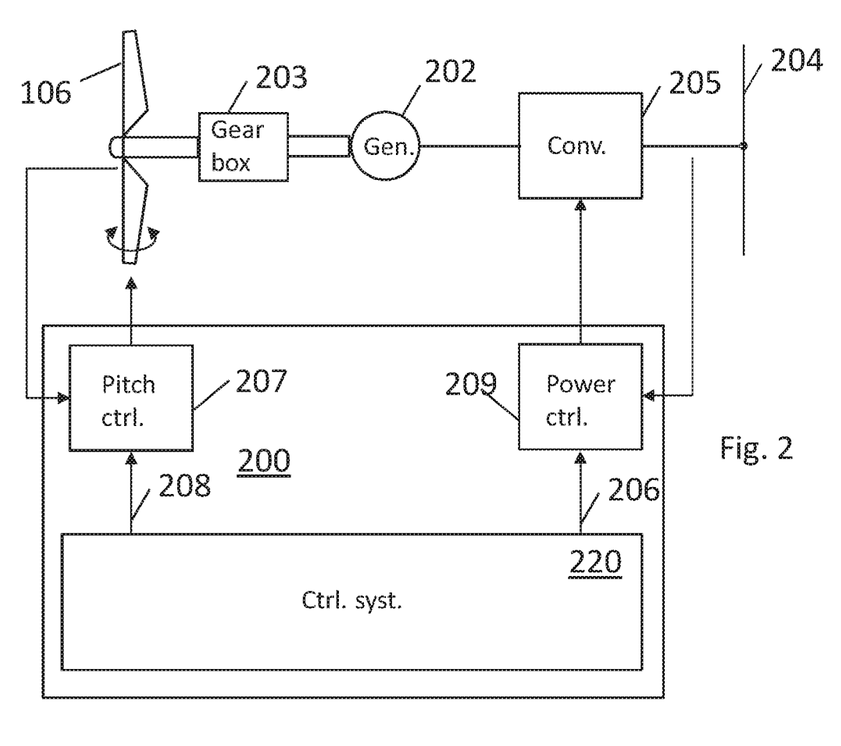
FIG. 2 is a schematic representation of a control system of the wind turbine.

FIG. 2 schematically illustrates an embodiment of a control system 200 together with elements of a wind turbine. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via an electrical converter 205. The electrical generator 202 and the converter 205 may be based on a full scale converter (FSC) architecture or a doubly fed induction generator (DFIG) architecture, but other types may be used.

The control system 200 comprises a number of elements, including at least one main controller 220 with a processor and a memory, so that the processor is capable of executing computing tasks based on instructions stored in the memory. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 controlled using a pitch reference signal 208, and a power system including a power controller 209 controlled using a power reference signal 206. The power controller 209 and the converter 205 may together be considered to be a power control system. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The control system, or elements of the control system, may be placed in a power plant controller (not shown) so that the turbine may be operated based on externally provided instructions.

To ensure that the power reference signal 206 does not damage the power (or torque) controller 209 or the converter 205, the size of the power reference signal 206 is limited so that it cannot exceed a predetermined maximum value, such as a maximum voltage value.

Figure 3:
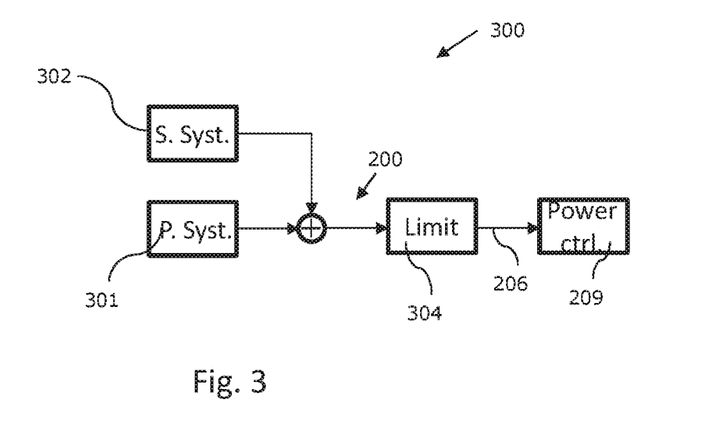
FIG. 3 illustrates a conventional scheme for limiting power reference signals.

FIG. 3 illustrates elements of a control system 300 which employs a conventional scheme for limiting the power reference signal 206. The power reference signal comprises two different components. A primary component is generated by a primary control system 301 ("P. Syst.") to control the power output of the turbine. A secondary component is generated by a secondary control system 302 ("S. Syst.") to provide small variations to the power reference signal, for example for damping control. The primary control system 301 may be the main controller 220, and the secondary control system 302 may be a separate damping controller. Alternatively, both the primary control system 301 and secondary control system 302 may be contained within the main controller 220.

The signals from the two control systems are summed to produce the power reference signal 206. A limit is then applied to the power reference signal 206 by limiter 304, before the power reference signal 206 is passed to the power controller 209 or converter 205 (i.e. to the power control system or torque control system). Although shown as separate components for clarity, in practice the limit may be applied by the main controller 220, the power controller 209, or the converter 205.

If the power reference signal 206 exceeds the limit, some of the signal 206 is lost. As the secondary component acts as a small variation on top of the primary signal, it is likely that the secondary component (or part of it) will be lost when the signal 206 is saturated in this way. This may limit the ability of the secondary control system 301 to control the turbine, for example limiting the damping that can be applied.

It has been realised in the present invention that small or temporary variations in the power reference signal are not likely to cause damage to the power or torque control system. The conventional method of applying a single limit to a combined power reference signal therefore unnecessarily cuts out secondary control signals.

Figure 4:
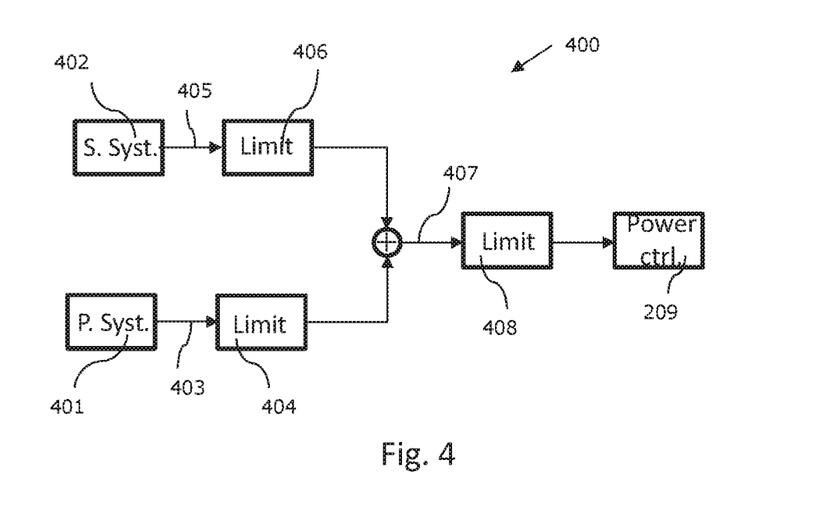
FIG. 4 illustrates a scheme for limiting power reference signals according to the present invention.

FIG. 4 illustrates elements of a control system 400 which employs a scheme for limiting the power reference signal 206 according to the present invention, which can avoid this drawback. In this method, the signal from the primary control system 401 is limited independently of the signal from the secondary control system/s 402.

Primary control system 401 produces a primary power reference signal 403. A primary power reference signal limit is applied to the primary power reference signal 403 by primary limiter 404. Similarly, secondary control system 402 produces a secondary power reference signal 405. A secondary power reference signal limit is applied to the secondary power reference signal 405 by secondary limiter 406. As with the method of FIG. 3, the limiters 404, 406 are in practice part of the main controller 220, the power controller 209 or the converter 205. The converter may apply a torque to the rotor of the turbine based on the received combined power reference signal.

Only after the primary and secondary limits have been applied to the respective signals are the primary power reference signal 403 and secondary power reference signal 405 summed to form the combined power reference signal 407. The combined power reference signal may optionally be further limited according to a combined limit by limiter 408, before being passed to power controller 209, and/or the converter 205 (i.e. the power or torque control system). Applying this further limit may provide an additional layer of protection to the power or torque control system.

The present method therefore distinguishes between a main, primary power reference signal, which does have the potential to cause damage to the power or torque control system; and a secondary power reference signal, which is not likely to cause damage. Separate limits are applied to each component before the primary and secondary signals are combined into the power reference signal. In this way, the power or torque control system is protected, but secondary control mechanisms such as damping systems are not unnecessarily limited.

The primary power reference signal may be associated with turbine output power control. The secondary power reference signal may be associated with secondary control mechanisms, such as damping control.

Figure 5:
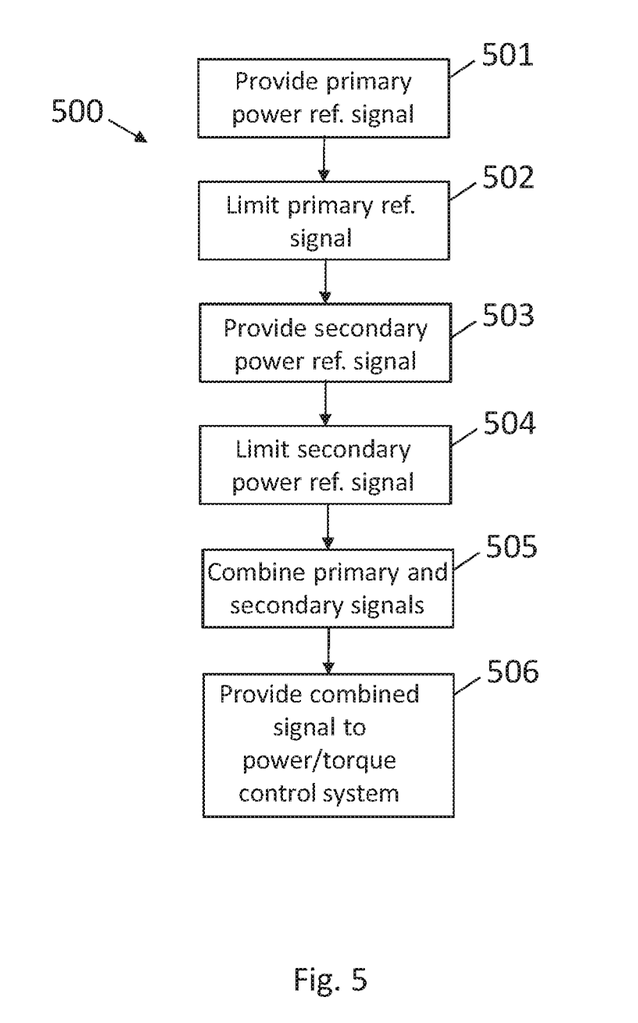
FIG. 5 illustrates the method steps of the scheme of FIG. 4.

FIG. 5 shows a flowchart of the steps of a method 500 that may be followed to implement the scheme illustrated in FIG. 4.

At step 501, a primary power reference signal 403 is provided. The primary power reference signal may be a static or semi-static signal. In particular, the primary power reference signal may be considered static relative to a characteristic time scale of the secondary signal (e.g. the period of an alternating secondary signal).

At step 502, the primary power reference signal 403 is limited according to a primary signal limit.

At step 503, a secondary power reference signal 405 is provided.

At step 504, the secondary power reference signal 405 is limited according to a secondary signal limit. In general, the secondary signal limit may be much smaller than the primary signal limit, for example less than 5% of the primary signal limit.

At step 505, the primary power reference signal 403 and the secondary power reference signal 405 are combined to provide a combined power reference signal 407.

At step 506, the combined power reference signal 407 is provided to a power or torque control system of the wind turbine. This may comprise passing the combined power reference signal 407 to the power controller 209, a torque controller, or directly to the converter 205.

The secondary power reference signal 405 may be an alternating power reference signal or a temporary power reference signal. An alternating signal averages over time to zero, and so the long term impact on the power or torque control system is limited, even if the alternating signal brings the combined power reference signal above the conventional limit for that controller. Similarly, a temporary power reference signal does not have a long term impact on the health of the power or torque control system. A temporary signal may be a pulse, or other signal with a short duration. For example, the pulse duration may be between 1 and 30 seconds, or between 10 and 30 seconds. The maximum pulse duration may vary depending on the current power setting of the turbine 100, or the size of the primary power reference. For example, the duration may be 10 seconds at 10% of rated power, or 30 seconds at 2% of rated power.

The secondary power reference signal itself may comprise a plurality of (secondary) control system signals summed together. For example, the secondary power reference signal may comprise signal associated with drive train damping (DTD), and a signal associated with side-side tower damping (SSTD). In some embodiments of the invention, each control system signal may be individually limiting according to a respective individual limit, prior to combining those signals together to form the secondary power reference signal 405.

In other words, an individual limit may be applied to each separate component of the secondary power reference before those components are combined into the secondary power reference. This allows the limits to be set based on the nature of that component. For example, it may be desirable to allow the components associated with certain control systems to reach higher peak values than components associated with other control systems.

Figure 6:
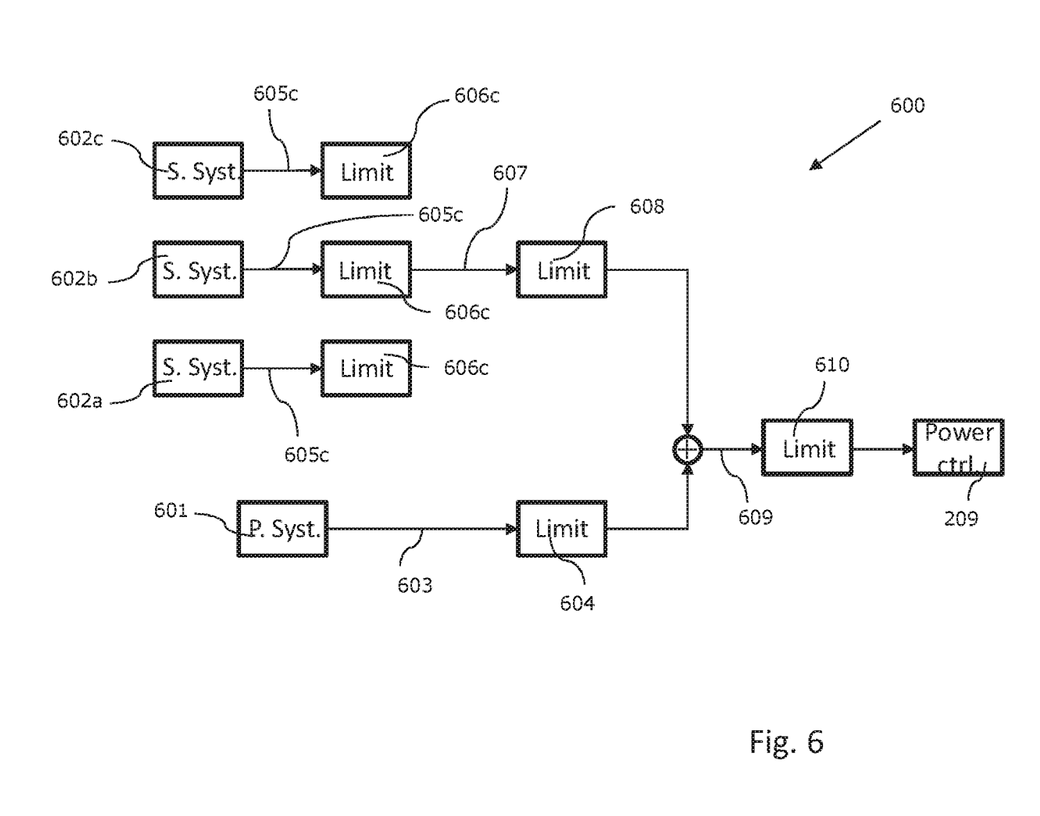
FIG. 6 illustrates an alternative scheme for limiting power reference signals.

FIG. 6 illustrates elements of an alternative controller 600 in which individual limits are applied to separate control system signals of the secondary power reference signal 405.

Primary control system 601 produces a primary power reference signal 603. A primary power reference signal limit is applied to the primary power reference signal 603 by primary limiter 604, similarly to the process described above in relation to FIG. 4.

A plurality of secondary control systems 602a-c feed into the secondary power reference signal. Although three secondary control systems 602a-c are represented in FIG. 6, any number of secondary control systems may be used. Each secondary control system 602a-c generates a respective control system signals 605a-c. A respective individual limit is applied to each control system signal 605a-c by limiters 606a-c. Only after the limit has been applied are the control system signals 605a-c summed together to form the secondary power reference signal 607. Optionally, the combined secondary power reference signal 607 may itself be limited according to a combined secondary limit by limiter 608. The secondary power reference signal 607 is then summed with the primary power reference signal 603 to form the combined power reference signal 609. The combined power reference signal may optionally be limited according to a combined power reference limit by limiter 610, before being provided to the power or power controller 209 (or to the converter 205, or generally to the power or torque control system).

The individual limits applied to the control system signals 605a-c may be predetermined, and may be selected based on the particular control system 602a-c generating that signal 605a-c. For example, important damping systems may be set a higher individual limit than other systems, to ensure that the damping control is not limited. In other embodiments, the individual limits may be variable. In particular, the limits may be varied based on the current needs of the turbine. The individual limits, or the secondary limit, may additionally or alternatively be set based on the requirements of the converter 205, or of components of the electrical grid to which the turbine is connected. For example, the limits may be set to ensure that the converter 205 or other components do not overheat.

Such embodiments may comprise identifying one or more of the plurality of control system signals 605a-c as a priority signal. Priority signals may be selected based on the current conditions of the respective secondary control systems 602a-c. The control system signals 605a-c that have been identified as priority signals may then be given increased individual limits, to prevent those signals becoming saturated. To compensate for this, the non-priority signals may be given reduced individual limits, to ensure that the combined secondary power reference 607 does not exceed a safe limit. This may comprise, for example identifying a lowest priority signal from the control system signals 605a-c, and lowering its individual limit sufficiently to compensate for the priority signals. If the limit of that lowest priority signal is reduced to zero, the limit of a next-lowest priority signal may then be adjusted, and so on. Alternatively, all non-priority signals may be adjusted, for example by applying a weighting function to the non-priority signals.

In general, modifying the non-priority signals of the plurality of control system signals may comprise applying a respective reduction factor to the one or more of the other signals of the plurality of control system signals. Such dynamic limitation ensures that the waveforms of the signals are retained, rather than simply clipping the highest peaks of the signals (i.e. a sine wave remains a sine wave, but reduced in scale). In alternative embodiments, clipping may be used to modify the signals.

Such embodiments thus allow certain secondary control systems 602a-c to be prioritised, whilst still protecting the power or torque control system from damage. This may be advantageous, for example, when a secondary control system is close to a supervision limit (e.g. an operational parameter of the turbine such as vibrations are so large that the turbine may have to be shut down). In some embodiments, this prioritisation scheme may only be implemented when it is determined that the secondary power reference signal 607 exceeds the secondary signal limit—i.e. where some of the secondary power reference signal 607 may be lost. In such embodiments, when the secondary power reference signal 607 is below the secondary power reference limit, the individual limits may be set at predetermined levels.

Figure 7:
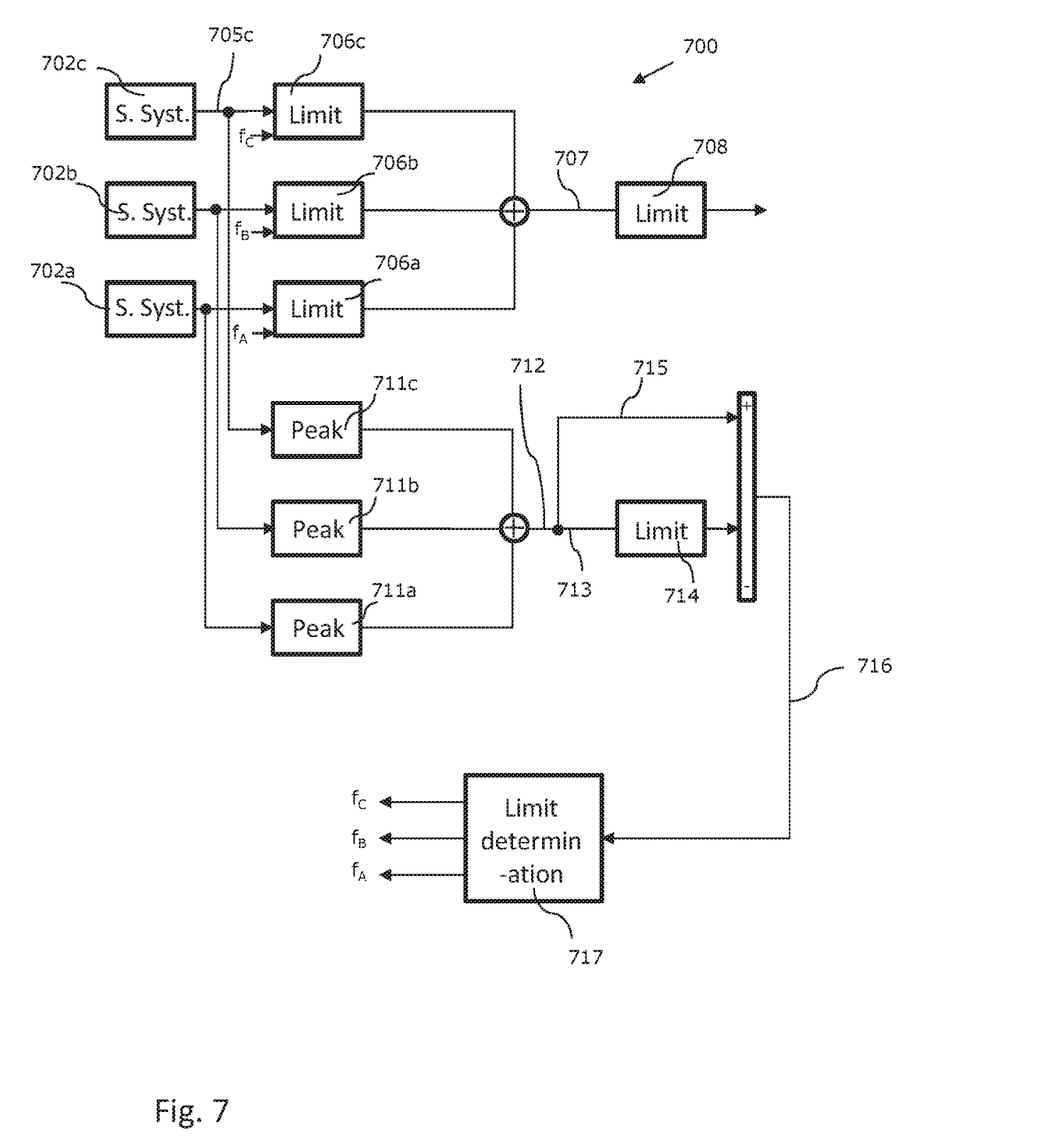
FIG. 7 illustrates a further alternative scheme for limiting power reference signals.

FIG. 7 illustrates components of a control system 700 in which prioritisation of secondary control system signals is implemented. As in system 600, a plurality of secondary control systems 702a-c feed into the secondary power reference signal. Although three secondary control systems 702a-c are represented in FIG. 7, any number of secondary control systems may be used. Each secondary control system 702a-c generates a respective control system signals 705a-c. A respective individual limit ($f_a$, $f_b$, $f_c$) is applied to each control system signal 705a-c by limiters 706a-c. Only after the limit has been applied are the control system signals 705a-c summed together to form the secondary power reference signal 707. A combined secondary power reference limit is applied to the combined secondary power reference signal 707 by limiter 708. The combined secondary power reference signal 707 is then combined with the primary power reference signal, as described above for control system 600.

The individual limits $f_a$, $f_b$, $f_c$ are selected based on the difference between the sum of the control signals 705a-c, and the combined secondary power limit. The peak value of each control signal 705a-c is estimated by respective estimator blocks 711a-c. These peak values are summed together to provide a combined peak signal 712. The combined peak signal is then split into two portions 713, 714. The combined secondary power reference limit is applied to a first portion by limiter 714. The second portion 715 is not limited. The difference between the second portion 715 and the limited first portion 713 is then determined to produce different signal 716. Difference signal 716 is effectively the total amount of signal that must be removed from the control system signals 702a-c to meet the combined secondary power reference signal limit. The difference signal 716 is provided to limit determination block 717, which sets the individual limits $f_a$, $f_b$, $f_c$ based on the difference signal 716 and the respective priorities of the secondary control systems 702a-c.

It is noted that, as with the other embodiments of control systems described above, at least some of the various elements of control system 700 may actually be implemented as operations performed by the main controller 220, or other controllers of the control system 200. In particular, a controller of the wind turbine may be configured to perform the steps of: estimating a peak value of each control signal 705a-c; summing the peak values; determining a difference between the sum of the peak values and the combined secondary power reference limit; and selecting the individual limits based on the difference and based on a priority associated with the secondary control systems 702a-c.

As well as the individual limits being variable, any other limit described in the embodiments above may also be variable. For example, the combined (i.e. primary+secondary) signal limit may be variable. This combined signal limit may be adjusted based on current turbine conditions. For example, the main turbine controller could adjust the combined signal limit, or the power or torque control system (or converter) may be configured to adjust the combined signal limit. For example, the converter is getting too hot, the combined signal limit may be reduced.

Although the invention has been described above with reference to one or more preferred embodiments, it will be appreciated that various changes or modifications may be made without departing from the scope of the invention as defined in the appended claims.

The invention claimed is:

1. A method of controlling a wind turbine, the method comprising:
   generating a primary power reference signal;
   applying a primary signal limit for the primary power reference signal;
   generating a secondary power reference signal comprising a plurality of control system signals summed together, the plurality of control system signals corresponding to a plurality of secondary control systems of the wind turbine;
   determining that the secondary power reference signal exceeds a secondary signal limit;
   identifying, based on current conditions of the plurality of secondary control systems, one or more signals of the plurality of control system signals as a priority signal;
   modifying one or more other signals of the plurality of control system signals to limit the secondary power reference signal to within the secondary signal limit;
   combining the primary power reference signal and the secondary power reference signal to provide a combined power reference signal; and
   providing the combined power reference signal to a power or torque control system of the wind turbine.

2. The method of claim 1, wherein the secondary power reference signal is an alternating power reference signal or a temporary power reference signal.

3. The method of claim 1, wherein applying the secondary signal limit comprises individually limiting each control system signal according to a respective individual limit.

4. The method of claim 1, wherein modifying the one or more other signals of the plurality of control system signals comprises applying a respective reduction factor to the one or more other signals of the plurality of control system signals.

5. The method of claim 1, wherein identifying one or more signals of the plurality of control system signals as a priority signal comprises:
   determining that an operational parameter of the wind turbine is approaching or exceeds a supervision limit; and selecting a first control system signal of the plurality of control system signals associated with the operational parameter as the priority signal.

6. The method of claim 1, wherein one or more of the control system signals are associated with damping control systems of the wind turbine.

7. The method of claim 1, wherein the primary power reference signal is a static or semi-static signal.

8. The method of claim 1, further comprising:
applying a combined signal limit for the combined power reference signal prior to providing the combined power reference signal to the power or torque control system.

9. The method of claim 8, wherein the combined signal limit is variable.

10. The method of claim 1, wherein the secondary signal limit limits a peak value of the secondary power reference signal to a value that is a predetermined proportion of the primary signal limit.

11. The method of claim 1, wherein the power or torque control system comprises one of:
a power controller;
a torque controller; and
a converter of the wind turbine.

12. The method of claim 1, wherein the secondary signal limit is less than five percent of the primary signal limit.

13. The method of claim 1, wherein generating the primary power reference signal is performed using a primary control system configured to control a power output of the wind turbine according to a requested power output level.

14. A wind turbine control system configured to perform an operation comprising:
generate a primary power reference signal;
apply a primary signal limit for the primary power reference signal;
generate a secondary power reference signal comprising a plurality of control system signals summed together, the plurality of control system signals corresponding to a plurality of secondary control systems of the wind turbine;
determine that the secondary power reference signal exceeds a secondary signal limit;
identify, based on current conditions of the plurality of secondary control systems, one or more signals of the plurality of control system signals as a priority signal;
modify one or more other signals of the plurality of control system signals to limit the secondary power reference signal to within the secondary signal limit;
combine the primary power reference signal and the secondary power reference signal to provide a combined power reference signal; and
provide the combined power reference signal to a power or torque control system of the wind turbine.

15. The control system of claim 14, wherein the secondary power reference signal is an alternating power reference signal or a temporary power reference signal.

16. A wind turbine, comprising:
a tower;
a nacelle disposed on the tower;
a generator disposed in the nacelle;
a rotor mechanically coupled to the generator at one end of the rotor and having a plurality of blades at another end of the rotor; and
a control system configured to perform an operation comprising:
generating a primary power reference signal;
applying a primary signal limit for the primary power reference signal;
generating a secondary power reference signal comprising a plurality of control system signals summed together, the plurality of control system signals corresponding to a plurality of secondary control systems of the wind turbine;
determining that the secondary power reference signal exceeds a secondary signal limit;
identifying one or more signals of the plurality of control system signals as a priority signal;
modifying one or more other signals of the plurality of control system signals to limit the secondary power reference signal to within the secondary signal limit;
combining the primary power reference signal and the secondary power reference signal to provide a combined power reference signal; and
providing the combined power reference signal to a power or torque control system of the wind turbine.

17. The wind turbine of claim 16, wherein the secondary power reference signal is an alternating power reference signal or a temporary power reference signal.

18. The wind turbine of claim 16, the operation further comprising:
applying a combined signal limit for the combined power reference signal prior to providing the combined power reference signal to the power or torque control system.

* * * * *